(12) United States Patent
Mallette

(10) Patent No.: US 10,688,890 B2
(45) Date of Patent: Jun. 23, 2020

(54) SEAT ASSEMBLY THAT RECLINES AND INCLUDES A BACK PANEL

(71) Applicant: Gulfstream Aerospace Corporation, Savannah, GA (US)

(72) Inventor: Jeremiah Mallette, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 16/005,478

(22) Filed: Jun. 11, 2018

(65) Prior Publication Data
US 2018/0361884 A1 Dec. 20, 2018

Related U.S. Application Data

(60) Provisional application No. 62/521,821, filed on Jun. 19, 2017.

(51) Int. Cl.
| | | |
|---|---|---|
| *B60N 2/22* | (2006.01) | |
| *B60N 2/68* | (2006.01) | |
| *B64D 11/06* | (2006.01) | |

(52) U.S. Cl.
CPC ........... *B60N 2/2222* (2013.01); *B60N 2/686* (2013.01); *B64D 11/064* (2014.12); *B64D 11/0641* (2014.12)

(58) Field of Classification Search
CPC .... B60N 2/2222; B60N 2/686; B64D 11/064; B64D 11/0641
See application file for complete search history.

(56) References Cited

U.S. PATENT DOCUMENTS

| | | | | |
|---|---|---|---|---|
| 6,305,644 B1 * | 10/2001 | Beroth | ................... | B64D 11/00 244/118.5 |
| 2003/0025370 A1 * | 2/2003 | Hensel | ..................... | A47C 7/38 297/285 |

(Continued)

FOREIGN PATENT DOCUMENTS

| | | | | | |
|---|---|---|---|---|---|
| CA | 2934783 A1 | * | 7/2015 | ............... | B60N 2/34 |
| DE | 102004049807 A1 | * | 4/2006 | ............ | B60N 2/206 |

(Continued)

OTHER PUBLICATIONS

Intellectual Property Office of United Kingdom, Search Report for Application No. GB1809720.4, dated Dec. 7, 2018.

(Continued)

*Primary Examiner* — Timothy J Brindley
(74) *Attorney, Agent, or Firm* — LKGlobal | Lorenz & Kopf, LLP

(57) ABSTRACT

Seat assemblies are provided. In one example, a seat assembly includes a seat frame. The seat frame includes a seat structure portion and a backrest structure portion pivotally coupled to the seat structure portion for movement between a substantially upright seat position and a substantially reclined seat position. An upper back shell panel is coupled to the seat frame. A lower back skirt panel has an upper edge portion and is disposed adjacent to the upper back shell panel such that a gap is present between an upper edge portion of the lower back skirt panel and an outer surface of the upper back shell panel. The lower back skirt panel and the upper back shell panel allow relative movement between each other during movement between the substantially upright seat position and the substantially reclined seat position while maintaining at least a portion of the gap.

19 Claims, 12 Drawing Sheets

(56) References Cited

U.S. PATENT DOCUMENTS

| | | |
|---|---|---|
| 2006/0202535 A1 | 9/2006 | Heidmann et al. |
| 2007/0210209 A1 | 9/2007 | Saint-Jalmes et al. |
| 2008/0067850 A1* | 3/2008 | Stenstrom ............... B60N 2/062 297/353 |
| 2013/0088066 A1 | 4/2013 | Sasaki et al. |
| 2013/0200673 A1 | 8/2013 | Rdzanek et al. |
| 2013/0292960 A1* | 11/2013 | Shyshkin ............... B60R 25/014 296/65.16 |
| 2014/0203611 A1* | 7/2014 | Kondrad ................ B60N 2/22 297/354.1 |
| 2015/0145303 A1* | 5/2015 | Line ....................... B60N 2/643 297/283.3 |
| 2017/0015423 A1* | 1/2017 | Udriste ................... B60N 2/995 |
| 2017/0021930 A1* | 1/2017 | Henshaw ............. B64D 11/064 |
| 2018/0009339 A1* | 1/2018 | Durkee ................. B60N 2/3011 |
| 2018/0134181 A1* | 5/2018 | Ketels .................. B60N 2/1839 |

FOREIGN PATENT DOCUMENTS

| | | | | |
|---|---|---|---|---|
| DE | 102010005217 A1 * | 7/2011 | ............. | B64D 11/06 |
| DE | 102013225477 A1 * | 3/2015 | ............. | B60N 2/686 |
| DE | 102017107154 A1 | 10/2018 | | |
| EP | 1116654 B1 | 6/2005 | | |
| EP | 2974961 A1 * | 1/2016 | ......... | B64D 11/0627 |
| EP | 3053774 B1 * | 9/2017 | ........... | B60N 2/2209 |
| FR | 2818595 A1 * | 6/2002 | ............. | B64D 11/06 |
| JP | S6175761 A | 4/1986 | | |
| JP | S6388146 U | 6/1988 | | |
| JP | 2006082744 A | 3/2006 | | |
| JP | 2006204634 A | 8/2006 | | |
| JP | 2008035933 A | 2/2008 | | |
| JP | 2008054727 A | 3/2008 | | |
| KR | 101353357 B1 | 1/2014 | | |
| WO | WO-2008028548 A1 * | 3/2008 | ........... | B60N 2/0232 |
| WO | 2017065706 A1 | 4/2017 | | |

OTHER PUBLICATIONS

German Patent and Trademark Office, Search Report in Application No. 102018114586.1, dated Jun. 1, 2019.

* cited by examiner

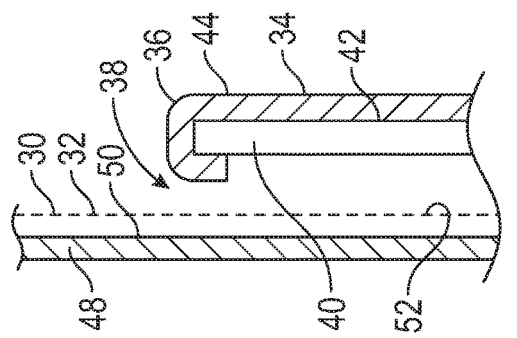
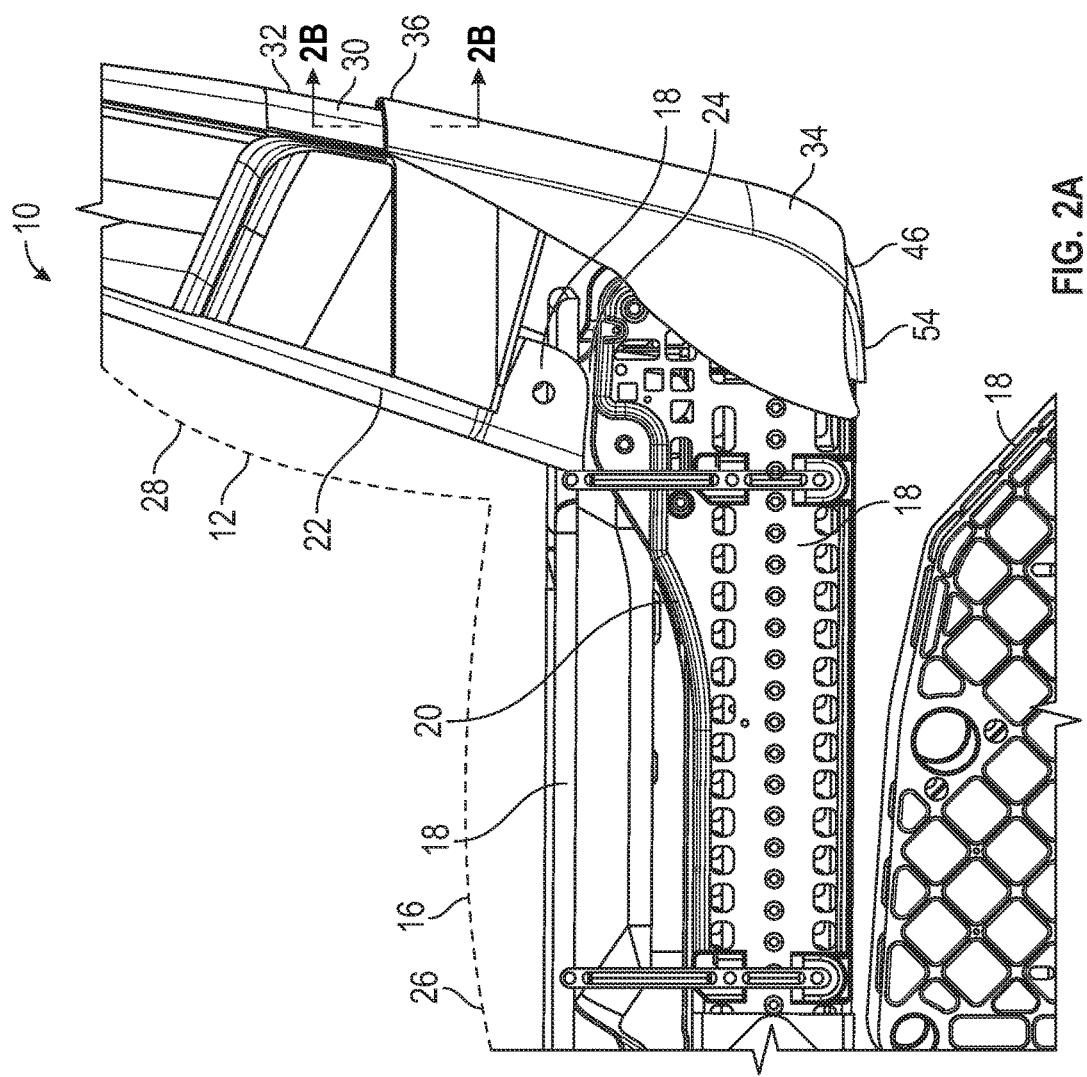

US 10,688,890 B2

SEAT ASSEMBLY THAT RECLINES AND INCLUDES A BACK PANEL

CROSS-REFERENCE TO RELATED APPLICATIONS

This application is related to and claims all available benefit of U.S. Provisional Patent Application 62/521,821 filed Jun. 19, 2017, the entire contents of which are herein incorporated by reference.

TECHNICAL FIELD

The technical field relates generally to a seat assembly, and more particularly, relates to a seat assembly that reclines and that includes a seat frame and a back panel that covers at least a portion of the seat frame.

BACKGROUND

Current seat assemblies, for example, for the commercial and/or military transportation industries (e.g., aircrafts, motor vehicles, and the like) include a seat frame often with a movable backrest structure that is operatively coupled to a lower seat structure for reclining. The movable backrest structure and the lower seat structure are covered by a soft covering (e.g., fabric or textile, leather or leather-like material, PVC or vinyl material, soft material and/or the like) that includes a closeout skirt portion on the backside of the seat assembly that bridges and covers a portion of the seat frame between the movable backrest structure and the lower seat structure to hide the underlying seat frame structure including any frame gaps or openings. When the movable backrest structure is moved from an upright seat position towards a reclined seat position, the closeout skirt portion of the soft covering wrinkles, bunches together, and/or wads up proximate the area between the backrest structure and the lower seat structure which is aesthetically undesirable.

Accordingly, it is desirable to provide improved seat assemblies including a covering on the backside of the seat assemble for hiding a seat frame structure proximate an area between a movable backrest structure and a lower seat structure in which the covering is aesthetically appealing and preferably does not wrinkle, bunch together, and/or wad up when the backrest structure is moved between positions. Furthermore, other desirable features and characteristics of the various embodiments described herein will become apparent from the subsequent detailed description and the appended claims, taken in conjunction with the accompanying drawings and this background.

SUMMARY

A seat assembly is provided are provided herein. In accordance with an exemplary embodiment, a seat assembly includes a seat frame for supporting the seat assembly. The seat frame includes a seat structure portion and a backrest structure portion that is pivotally coupled to the seat structure portion for movement between a substantially upright seat position and a substantially reclined seat position. An upper back shell panel is coupled to the seat frame and has an outer surface on a side opposite the seat frame. A lower back skirt panel has an upper edge portion and is disposed adjacent to the upper back shell panel such that a gap is present between the upper edge portion of the lower back skirt panel and the outer surface of the upper back shell panel. The lower back skirt panel and the upper back shell panel are cooperatively configured to allow relative movement between each other during movement of the seat frame between the substantially upright seat position and the substantially reclined seat position while maintaining at least a portion of the gap between the upper edge portion of the lower back skirt panel and the outer surface of the upper back shell panel.

In accordance with another exemplary embodiment, a seat assembly includes a seat frame for supporting the seat assembly. The seat frame includes a seat structure portion and a backrest structure portion pivotally coupled to the seat structure portion for movement between a substantially upright seat position and a substantially reclined seat position. An upper back shell panel is coupled to the seat frame and has an outer surface on a side opposite the seat frame. A lower back skirt panel has an upper edge portion and is disposed adjacent to the upper back shell panel such that a gap is present between the upper edge portion of the lower back skirt panel and the outer surface of the upper back shell panel. The lower back skirt panel and the upper back shell panel are cooperatively configured to allow relative movement between each other during movement of the seat frame between the substantially upright seat position and the substantially reclined seat position while maintaining at least a portion of the gap between the upper edge portion of the lower back skirt panel and the outer surface of the upper back shell panel. The lower back skirt panel and the upper back shell panel are operatively coupled together with a track-cam arrangement. The track-cam arrangement includes a track and a cam element that is configured to be advanced along the track to allow controlled relative movement between the lower back skirt panel and the upper back shell panel so as to facilitate maintaining the at least the portion of the gap between the upper edge portion of the lower back skirt panel and the outer surface of the upper back shell panel during movement between the substantially upright seat position and the substantially reclined seat position. The lower back skirt panel has a first outboard extension portion that includes the track and the upper back shell panel has a second outboard extension portion that includes a plate and the cam element extends generally outward from the plate into the track.

BRIEF DESCRIPTION OF THE DRAWINGS

The various embodiments will hereinafter be described in conjunction with the following drawing figures, wherein like numerals denote like elements, and wherein:

FIG. 2a is a perspective side view of a portion of a seat assembly in a substantially fully upright seat position in accordance with an exemplary embodiment;

FIG. 2b is a cross-sectional view of a portion of the seat assembly depicted in FIG. 2a;

FIG. 11b is a cross-sectional view of a portion of the seat assembly depicted in FIG. 11a;

DETAILED DESCRIPTION

Figure 1:
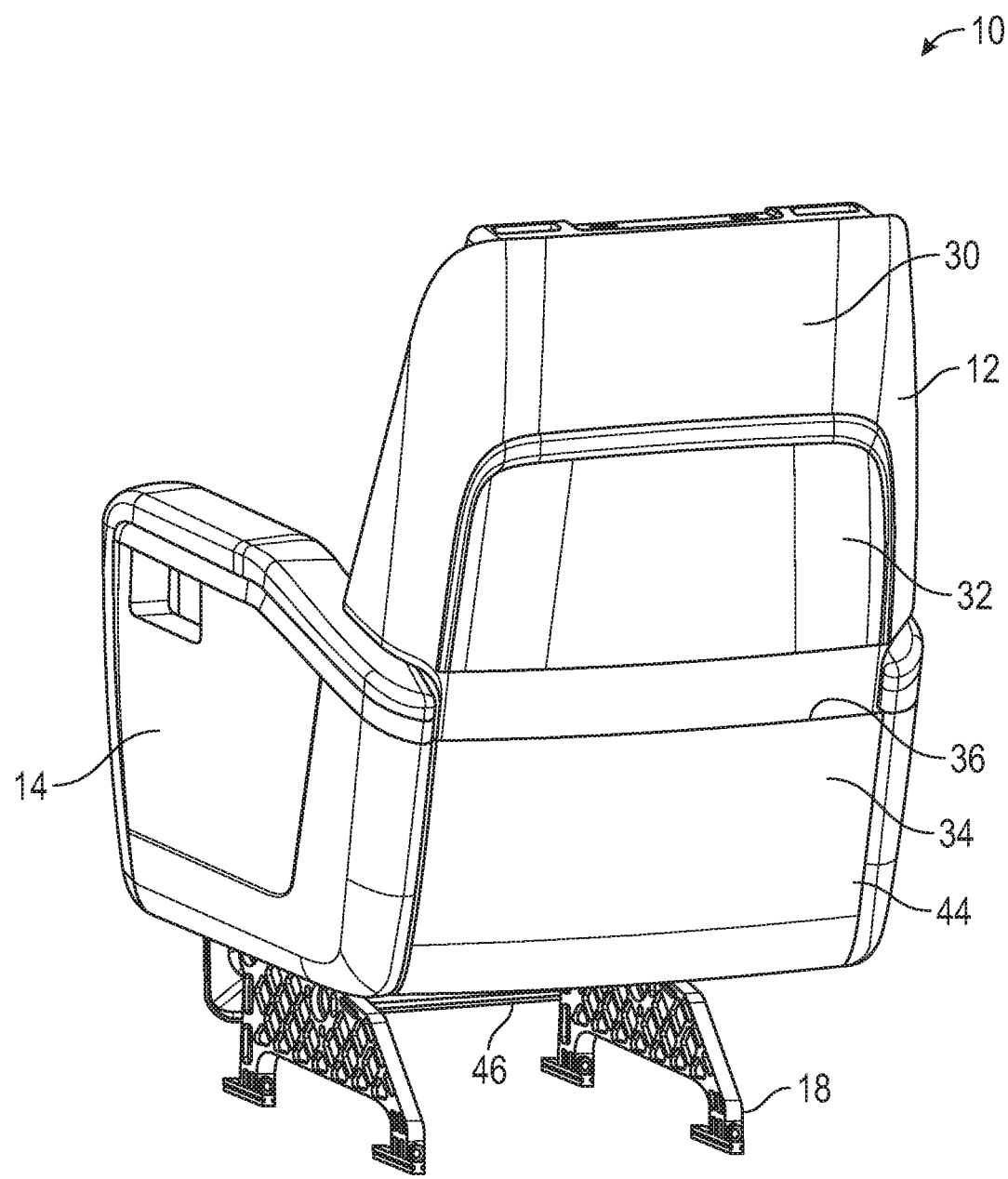
FIG. 1 illustrates a perspective rear view of a seat assembly in a substantially fully upright seat position in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to seat assemblies configured for reclining. The exemplary embodiments taught herein provide a seat assembly including a seat frame for supporting the seat assembly. The seat frame includes a seat structure portion and a backrest structure portion that is pivotally coupled to the seat structure portion for movement between a substantially upright seat position and a substantially reclined seat position. An upper back shell panel is coupled to the seat frame and has an outer surface on a side opposite the seat frame. A lower back skirt panel is disposed adjacent to the upper back shell panel such that the lower back skirt panel bridges and covers at least a portion of the seat frame between the movable backrest structure and the lower seat structure to hide the underlying seat frame structure including any corresponding frame gaps or openings in the portion of the seat frame. The lower back skirt panel has an upper edge portion and is arranged relative to the upper back shell panel such that a gap is present between the upper edge portion of the lower back skirt panel and the outer surface of the upper back shell panel.

In an exemplary embodiment, the lower back skirt panel includes a relatively rigid skirt panel having an outer rigid skirt panel surface that is on a side opposite the seat frame and a relatively soft covering material that covers the outer rigid skirt panel surface. The lower back skirt panel and the upper back shell panel are cooperatively configured to allow relative movement between each other during movement of the seat frame between the substantially upright seat position and the substantially reclined seat position while maintaining at least a portion of the gap between the upper edge portion of the lower back skirt panel and the outer surface of the upper back shell panel. In an exemplary embodiment, by maintaining at least a portion of the gap between the lower back skirt panel and the upper back shell panel during relative movement, interference between the panels is minimized and/or prevented thereby preventing scuffing, marring, damage, and/or premature wearing of the relatively soft covering material that covers the outer ridge skirt panel and/or independently, a relatively soft covering material that may optionally cover the upper back shell panel. Further, because the relatively soft covering material of the lower back skirt panel is supported by the relatively rigid skirt panel, the relatively soft covering material does not wrinkle, bunch together, and/or wad up when the seat assembly is moved between different seat positions, e.g., the substantially upright seat position and the substantially reclined seat position.

Figure 14:
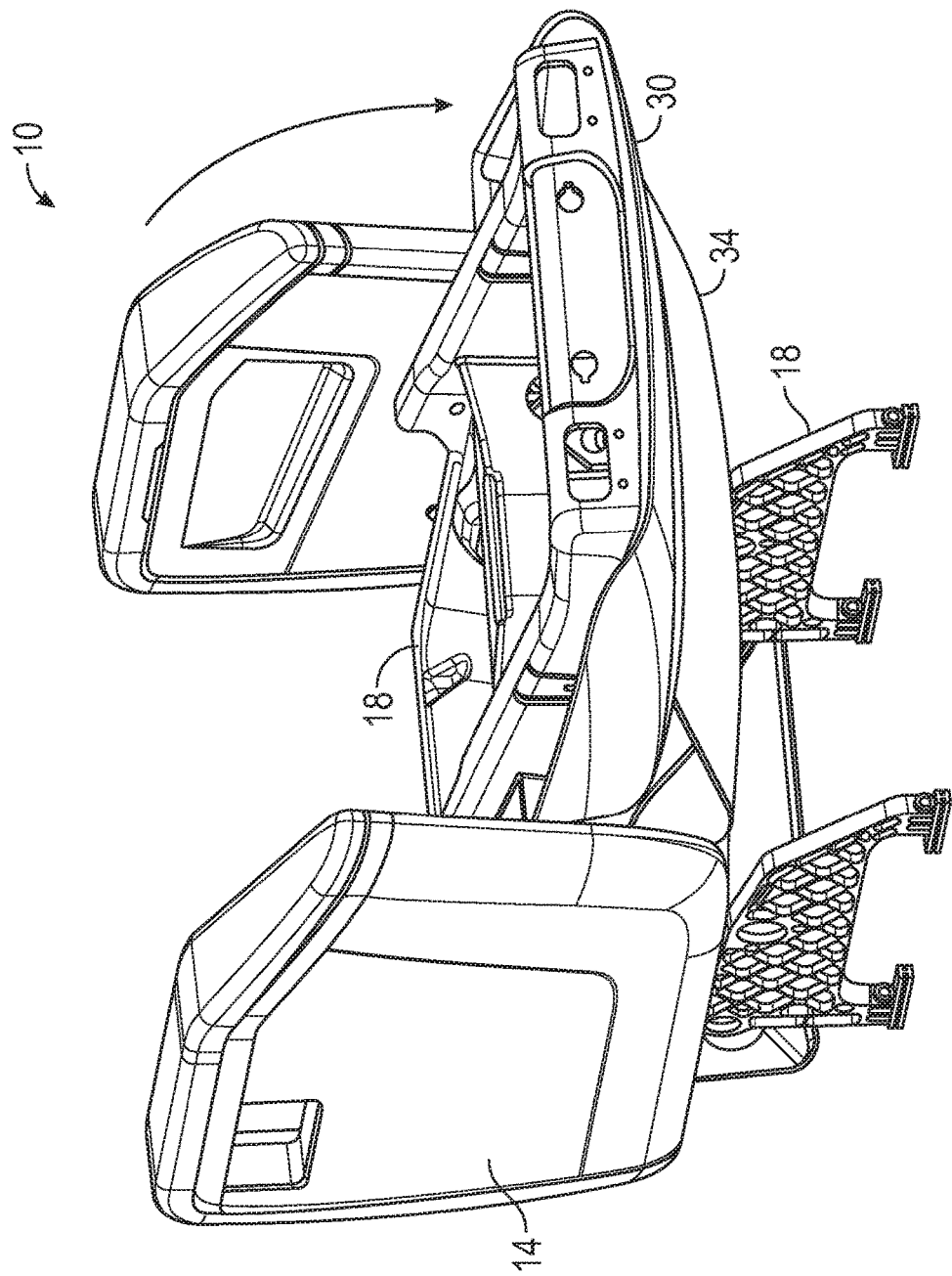
FIG. 14 is a perspective rear view of a seat assembly in a substantially fully reclined seat position in accordance with an exemplary embodiment.
Figure 15:
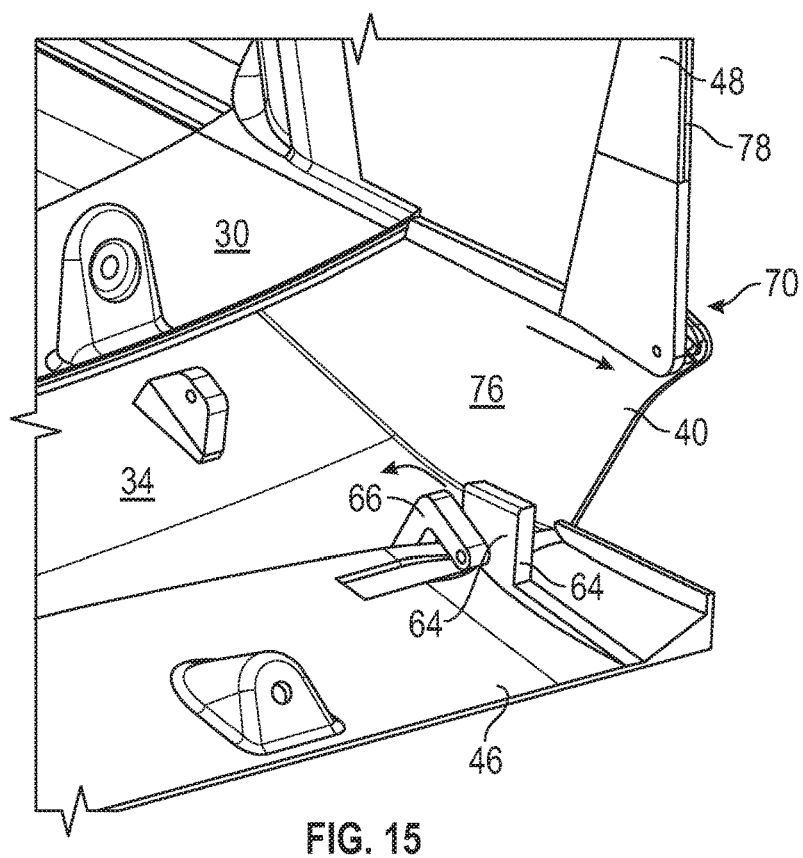
FIG. 15 is a perspective side view of an upper back shell panel, a lower back skirt panel, and a lower back close-out panel in a substantially fully reclined seat position in accordance with an exemplary embodiment.
Figure 16:
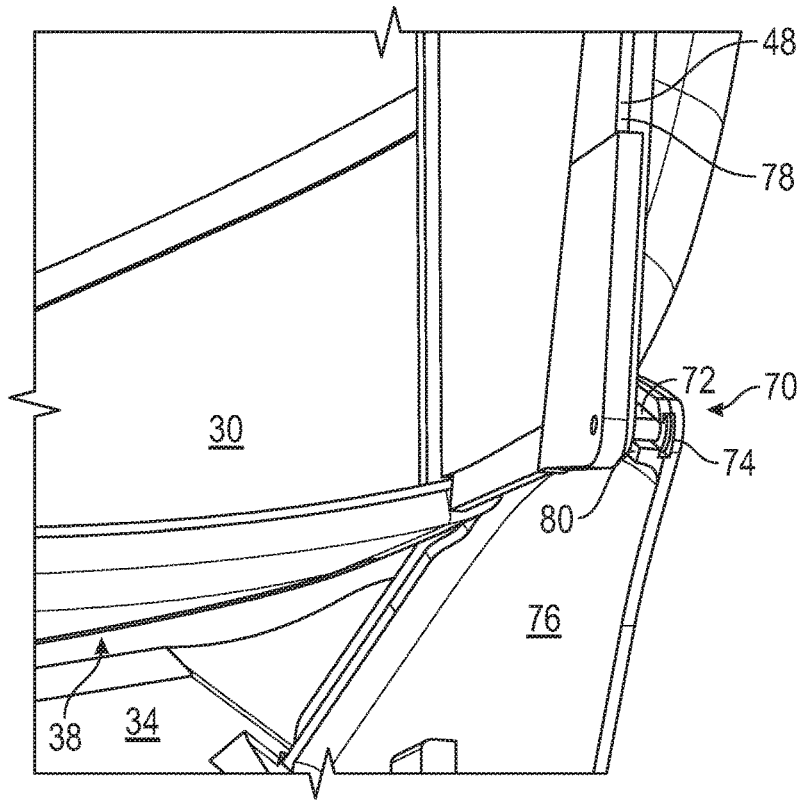
FIG. 16 is a perspective side view of an upper back shell panel and a lower back skirt panel in a substantially fully reclined seat position in accordance with an exemplary embodiment.

FIG. 1 illustrates a perspective rear view of a seat assembly 10 in a substantially fully upright seat position in accordance with an exemplary embodiment. FIG. 2a is a perspective side view of a portion of the seat assembly 10 depicted in FIG. 1. Referring to FIGS. 1-2a, the seat assembly 10 has a backrest portion 12, armrest portions 14, and a seat portion 16. The seat assembly 10 includes a seat frame 18 for supporting the seat assembly 10. As illustrated, the seat frame 18 includes a seat structure portion 20 and a backrest structure portion 22 for supporting the seat portion 16 and the backrest portion 12, respectively. The backrest structure portion 22 is pivotally coupled at 24 to the seat structure portion 20 for movement between the substantially upright seat position (as illustrated in FIG. 1) and a substantially reclined seat position (as illustrated in FIG. 14).

In an exemplary embodiment, the seat structure portion 20 of the seat frame 18 supports a seat covering or cushion 26 and the backrest structure portion 20 supports a backrest front covering or cushion 28 and an upper back shell panel 30 that is coupled to the seat frame 18. The upper back shell panel 30 has an outer surface 32 on a side opposite the seat frame 18. As will be discussed in further detail below, in an exemplary embodiment, a lower back skirt panel 34 is disposed adjacent to and is operatively coupled to the upper back shell panel 30. Referring also to FIG. 2b, the lower back skirt panel 34 has an upper edge portion 36 and is disposed adjacent to the upper back shell panel 30 such that a gap 38 is present between the upper edge portion 36 of the lower back skirt panel 34 and the outer surface 32 of the upper back shell panel 30. The upper back shell panel 30 covers an upper portion of the backrest structure portion 22 and the lower back skirt panel 34 bridges and covers at least a portion of the seat frame 18 between the backrest structure portion 22 and the seat structure portion 20 to hide the underlying seat frame structure including any corresponding frame gaps or openings in the portion of the seat frame 18.

In an exemplary embodiment, the lower back skirt panel 34 includes a relatively rigid skirt panel 40 having an outer rigid skirt panel surface 42 that is on a side opposite the seat frame 18 and a relatively soft covering material 44 that covers the outer rigid skirt panel surface 42. The relatively rigid skirt panel 40 may be formed of a relatively rigid thermoplastic material such as ABS, polycarbonate, nylon, polyester, polypropylene, or the like, a fiber reinforced composite material such as carbon fibers with epoxy, polyurethane, or polyester resin, glass fibers with epoxy, polyurethane, or polyester resin, natural fibers with epoxy, polyurethane, or polyester resin, or the like, or any other suitable interior trim substrate material. In an exemplary embodiment, the relatively rigid skirt panel 40 is formed of a fiber reinforced material including chopped fibers, e.g., chopped carbon fibers, and an epoxy resin matrix, and independently, is formed using a molding process such as a compression molding process with a two-part heated mold. Alternatively, other forming processes may be used to form the relatively rigid skirt panel 40 such as an injection molding process, a thermoforming process, or the like.

The relatively soft covering material 44 may be formed of a relatively flexible and/or soft such as leather, cloth or textile fabric (e.g., woven or knitted construction), thermoplastic skin material such as TPO, PVC, or the like, a bi-laminate or tri-laminate including a foam layer covered by a soft skin material layer, or any other suitable interior trim outer flexible and/or soft skin material. The relatively soft covering material 40 may be formed using a conventional leather forming process, a thermoforming process, a slush or rotational molding process, or other conventional process for forming an interior trim outer skin flexible and/or material.

In an exemplary embodiment, the gap 38 between the upper edge portion 36 of the lower back skirt panel 34 and the outer surface 32 of the upper back shell panel 30 is from about 0.1 to about 4 mm. In one example, the gap 38 is from about 0.5 to about 2 mm. In another example, the gap 38 is from about 0.5 to about 1.5 mm. In yet another example, the gap 38 is about 1 mm+/− about 0.3 mm.

Optionally, the upper back shell panel 30 may be covered with a soft covering material like the lower back skirt panel 34. In an exemplary embodiment, the upper back shell panel 30 includes a relatively rigid panel 48 having an outer rigid panel surface 50 that is on a side opposite the seat frame 18 and a relatively soft covering material 52 that covers the outer rigid panel surface 50. The relatively rigid panel 48 may be formed of a relatively rigid thermoplastic material such as ABS, polycarbonate, nylon, polyester, polypropylene, or the like, a fiber reinforced composite material such as carbon fibers with epoxy, polyurethane, or polyester resin, glass fibers with epoxy, polyurethane, or polyester resin, natural fibers with epoxy, polyurethane, or polyester resin, or the like, or any other suitable interior trim substrate material. In an exemplary embodiment, the relatively rigid panel 48 is formed of a fiber reinforced material including chopped fibers; e.g., chopped carbon fibers, and an epoxy resin matrix, and independently is formed using a molding process such as a compression molding process with a two-part heated mold. Alternatively, other forming processes may be used to form the relatively rigid panel 48 such as an injection molding process, a thermoforming process, or the like.

The relatively soft covering material 52 may be formed of a relatively flexible and/or soft such as leather, cloth or textile fabric (e.g., woven or knitted construction), thermoplastic skin material such as TPO, PVC, or the like, a bi-laminate or tri-laminate including a foam layer covered by a soft skin material layer, or any other suitable interior trim outer flexible and/or soft skin material. The relatively soft covering material 52 may be formed using a conventional leather forming process, a thermoforming process, a slush or rotational molding process, or other conventional process for forming an interior trim outer skin flexible and/or material.

Referring to FIG. 2a, in an exemplary embodiment and as will be discussed in further detail below, the seat assembly 10 includes a lower back close-out panel 46 that is coupled to the seat frame 18 and that is disposed adjacent to the lower back skirt panel 34 proximate a side opposite the upper back shell panel 30. The lower back close-out panel 46 may be a rigid panel or a rigid panel covered with a soft covering material like the lower back skirt panel 34. In an exemplary embodiment, the lower back close-out panel 46 includes a relatively rigid panel 54 formed of a relatively rigid thermoplastic material such as ABS, polycarbonate, nylon, polyester, polypropylene, or the like, a fiber reinforced composite material such as carbon fibers with epoxy, polyurethane, or polyester resin, glass fibers with epoxy, polyurethane, or polyester resin, natural fibers with epoxy, polyurethane, or polyester resin, or the like, or any other suitable interior trim substrate material. In an exemplary embodiment, the relatively rigid panel 54 is formed of a fiber reinforced material including chopped fibers; e.g., chopped carbon fibers, and an epoxy resin matrix, and independently is formed using a molding process such as a compression molding process with a two-part heated mold. Alternatively, other forming processes may be used to form the relatively rigid panel 54 such as an injection molding process, a thermoforming process, or the like.

Figure 3:
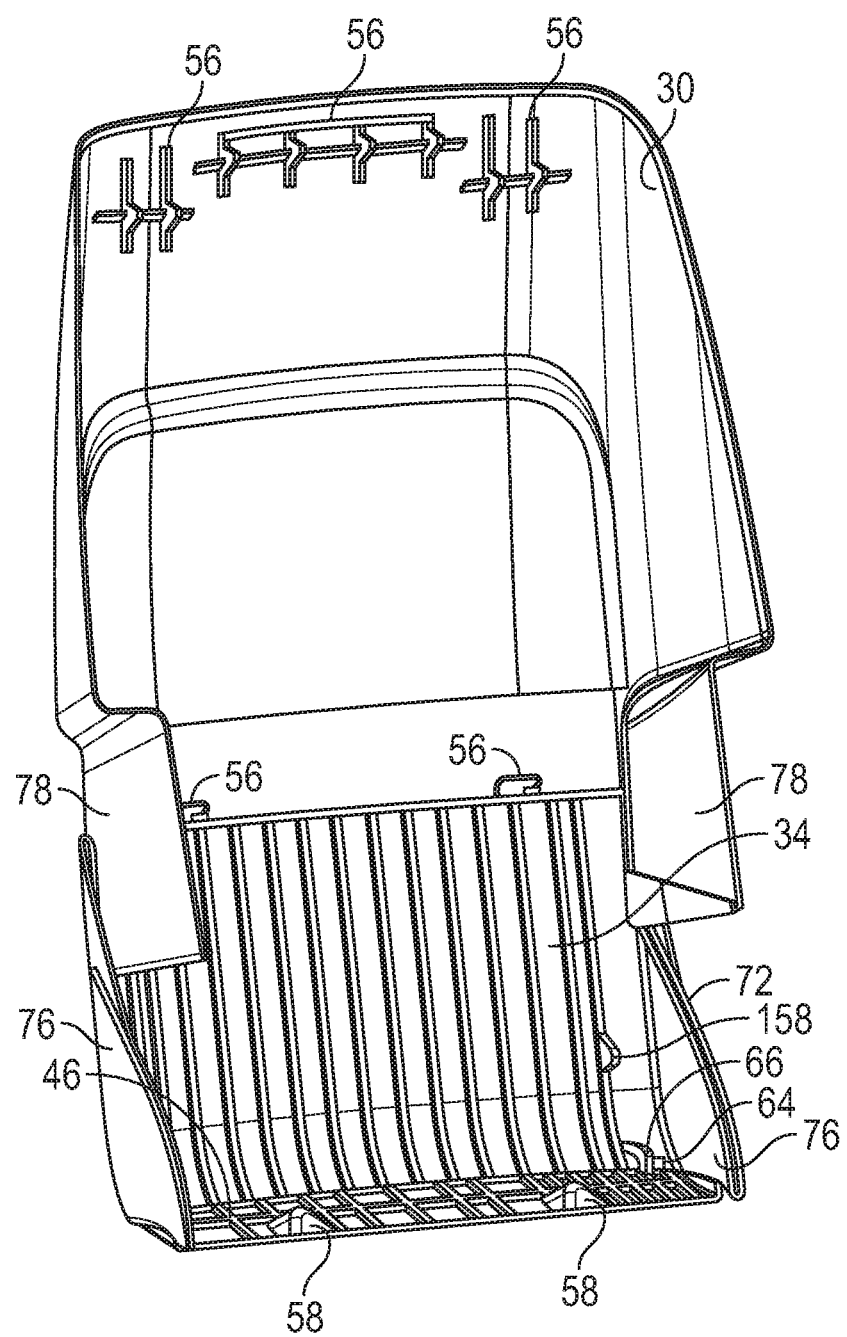
FIG. 3 is a perspective front view of an upper back shell panel and a lower back skirt panel in accordance with an exemplary embodiment.
Figure 4:
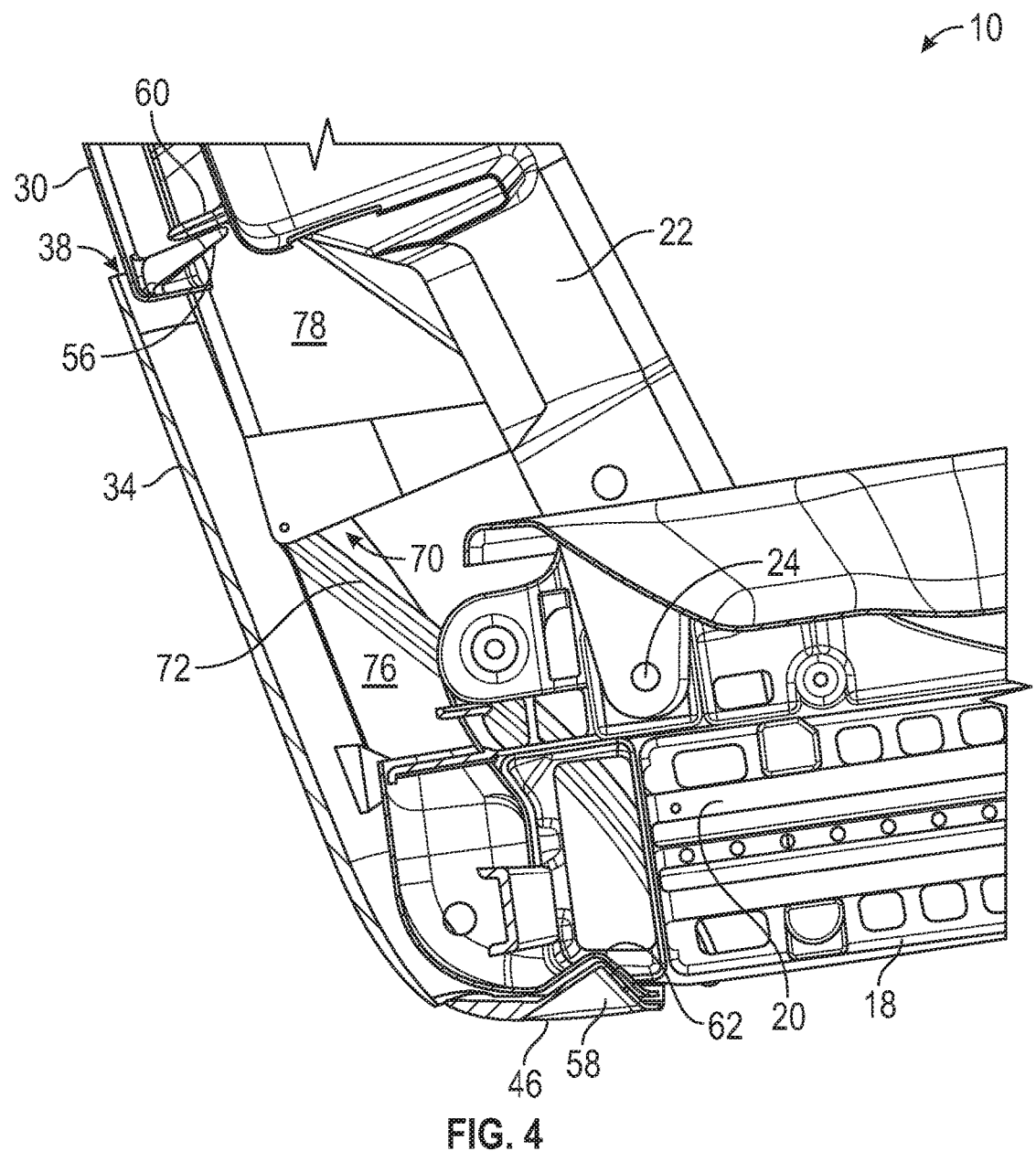
FIG. 4 is a perspective side view of a portion of a seat assembly in a substantially fully upright seat position in accordance with an exemplary embodiment
Figure 5:
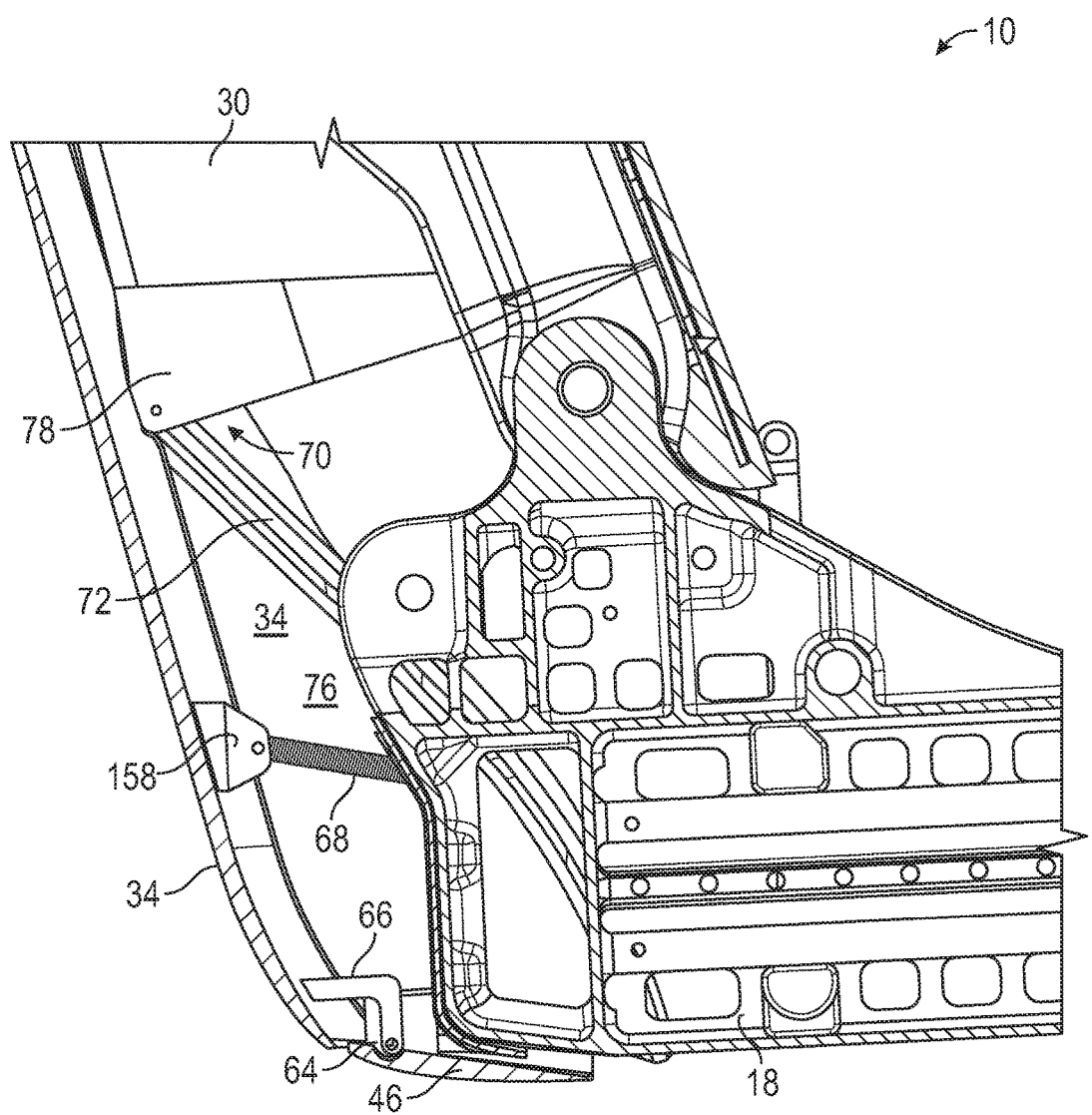
FIG. 5 is a perspective side view of a portion of a seat assembly in a substantially fully upright seat position in accordance with an exemplary embodiment.

Referring to FIGS. 3-4, the upper back shell panel 30 and the lower back close-out panel 46 correspondingly include a plurality of attachment features 56 and 58 for attaching to the seat frame 18. As illustrated, the seat frame 18 includes corresponding attachment features 60 and 62 for coupling with the attachment features 56 and 58 for attaching the panels 30 and 46 to the frame structure. In one example, the attachment features 56 and 60 each includes corresponding through holes that are correspondingly aligned for receiving a pin or other fastener element for coupling the upper back shell panel to the backrest structure portion 22 of the seat frame 18. Likewise, the attachment features 58 and 62 each include corresponding through holes that are correspondingly aligned for receiving a pin or other fastener element for coupling the lower back close-out panel 46 to the seat structure portion 20 of the seat frame 18.

Referring to FIGS. 3-5 and 8, in an exemplary embodiment, the lower back skirt panel 34 is pivotably coupled to the lower back close-out panel 46. As illustrated, the lower back close-out panel 46 includes attachment features 64 that are pivotably coupled with attachment features 66 of the lower back skirt panel 34. As illustrated, the attachment features 64 and 66 are configured as upstanding tabs and L-shaped tabs, respectively, each with through holes for receiving a pin 65 or other elongated element that allows the lower back skirt panel 34 to rotate or pivot relative to the lower back close-out panel 46 about the pins 65 or other elongated elements. In an exemplary embodiment and as will be discussed in further detail below, the lower back skirt panel 34 includes attachment features 158 (e.g., tabs with through holes or the like) each coupled to the seat frame 18 by an urging or biasing element 68 (e.g., spring or the like).

Referring to FIGS. 3-8, the lower back skirt panel 34 and the upper back shell panel 30 are cooperatively configured to allow relative movement between each other during movement of the seat frame 18 between the substantially upright seat position (e.g., as illustrated in FIG. 1) and the substantially reclined seat position (e.g., as illustrated in FIG. 14). As illustrated, the lower back skirt panel 34 and the upper back shell panel 30 are operatively coupled together with one or more track-cam arrangements 70. In an exemplary embodiment, the track-cam arrangement 70 includes a track 72 and a cam element 74 that is configured to be advanced along the track 72 to allow controlled relative movement between the lower back skirt panel 34 and the upper back shell panel 30.

As illustrated, the lower back skirt panel 34 has two outboard extension portions 76, one outboard extension portion 76 on the left-hand side and the other outboard extension portion 76 on the right-hand side of the seat assembly 10. Likewise, the upper back shell panel 30 has two outboard extension portions 78, one outboard extension portion 78 on the left-hand side and the other outboard extension portion 78 on the right-hand side of the seat assembly 10. In an exemplary embodiment, the track 72 is formed as a groove, e.g., curved "T-shaped" groove, that extends along a corresponding outboard extension portion 76 of the lower back skirt panel 34 generally from a rearward upper section to a forward lower section of the outboard extension portion 76. The track 72 may be integrally formed in the outboard extension portion 76 of the lower back skirt panel 34, or alternatively, may be a separate piece that is attached or otherwise mounted to the lower back skirt panel 34, such as, for example, a bracket (e.g., aluminum or other metal, or the like) with a machined in channel defining the track 72 which is mounted to the outboard extension portion 76 of the lower back skirt panel 34.

Figure 6:
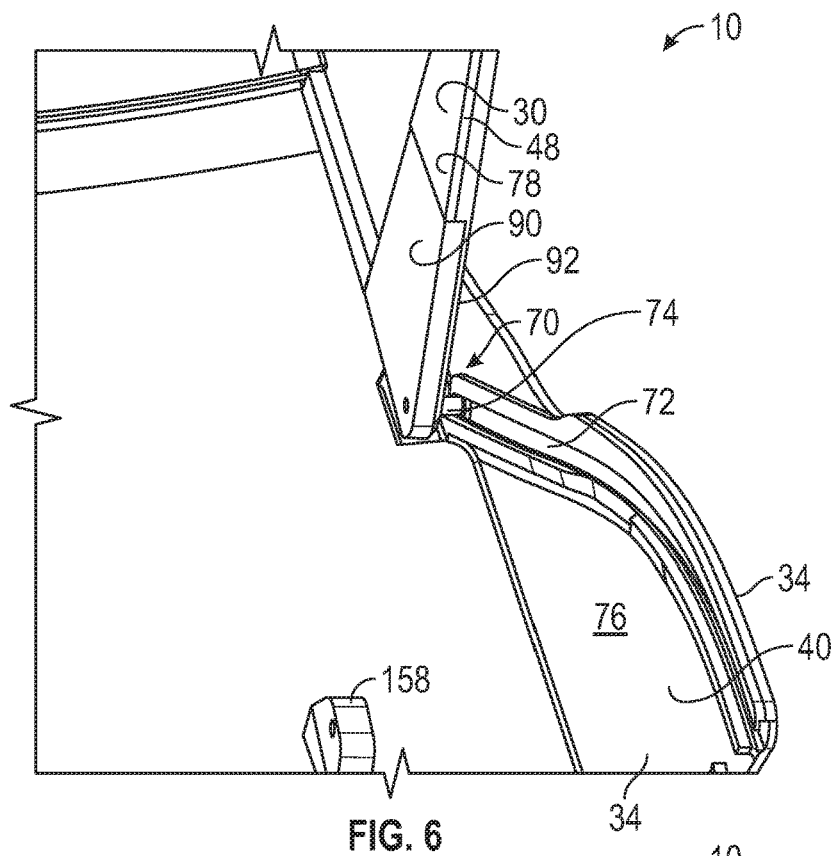
FIG. 6 is a perspective side view of an upper back shell panel and a lower back skirt panel in a substantially fully upright seat position in accordance with an exemplary embodiment.
Figure 7:
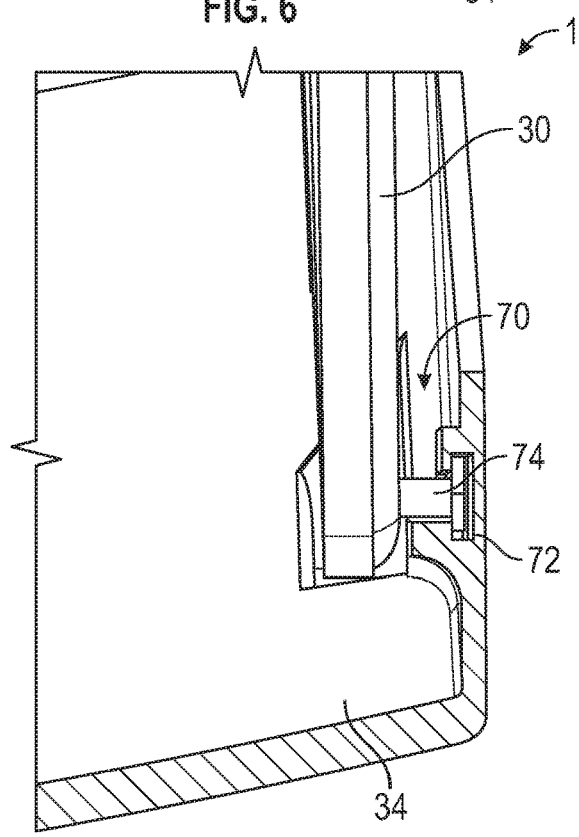
FIG. 7 is a sectional view of an upper back shell panel and a lower back shell skirt panel in accordance with an exemplary embodiment.
Figure 8:
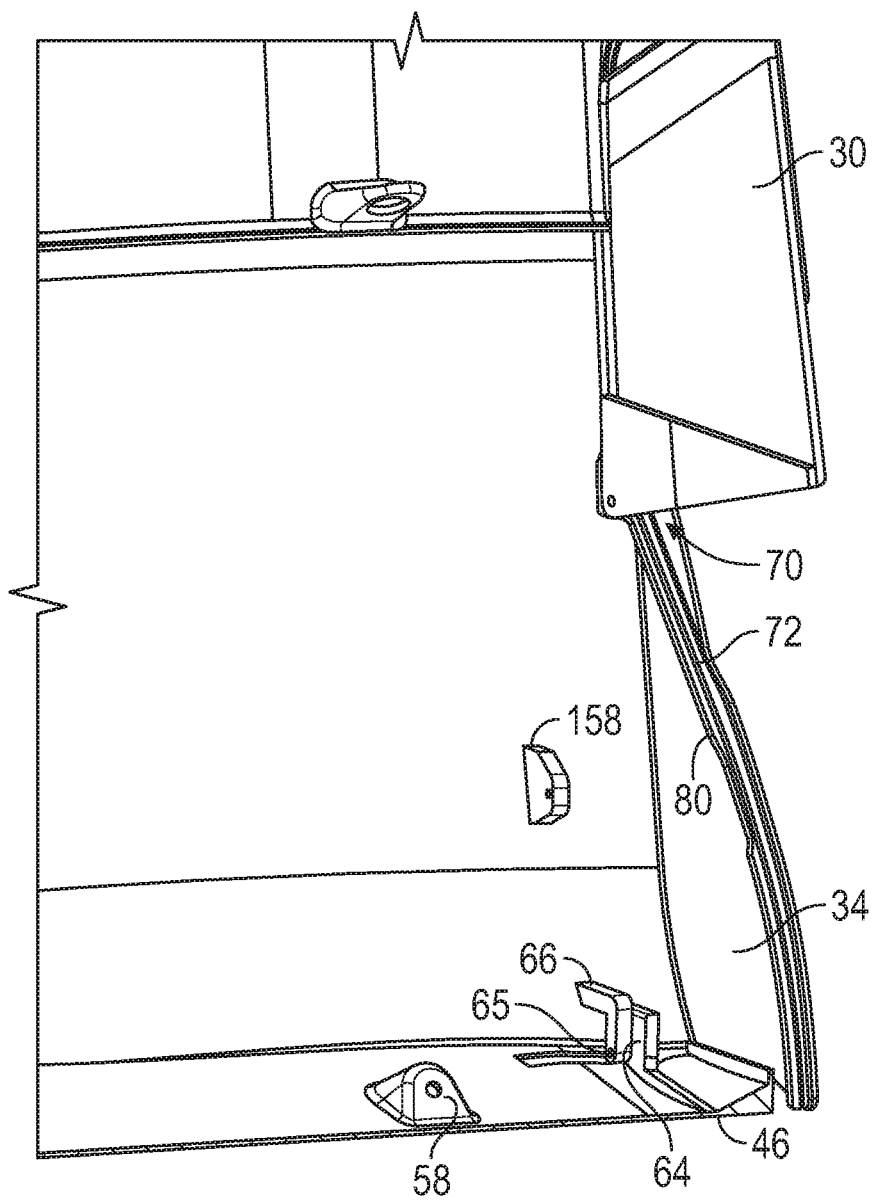
FIG. 8 is a perspective side view of an upper back shell panel, a lower back skirt panel, and a lower back close-out panel in a substantially fully upright seat position in accordance with an exemplary embodiment.
Figure 9:
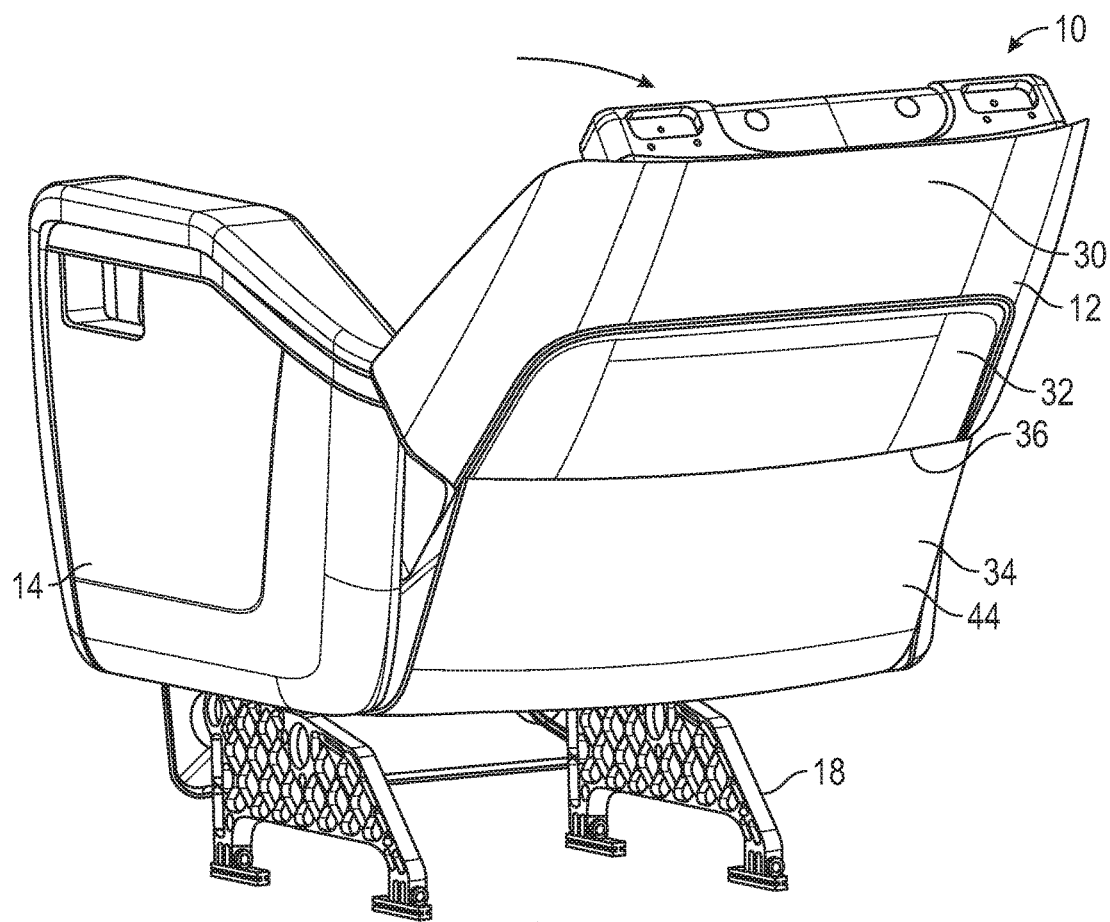
FIG. 9 is a perspective rear view of a seat assembly in a partially reclined seat position in accordance with an exemplary embodiment.
Figure 10:
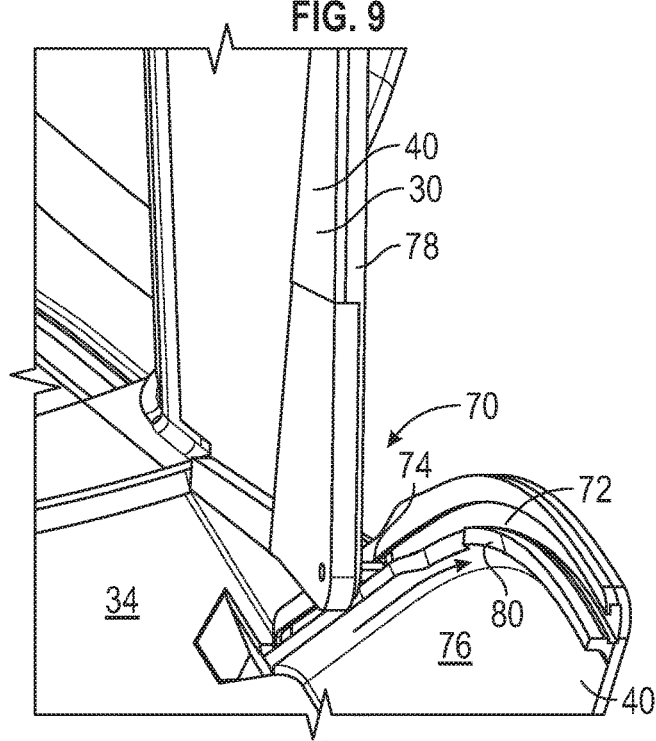
FIG. 10, is a perspective side view of an upper back shell panel and a lower back skirt panel in a 30° reclined seat position in accordance with an exemplary embodiment.
Figure 11A:
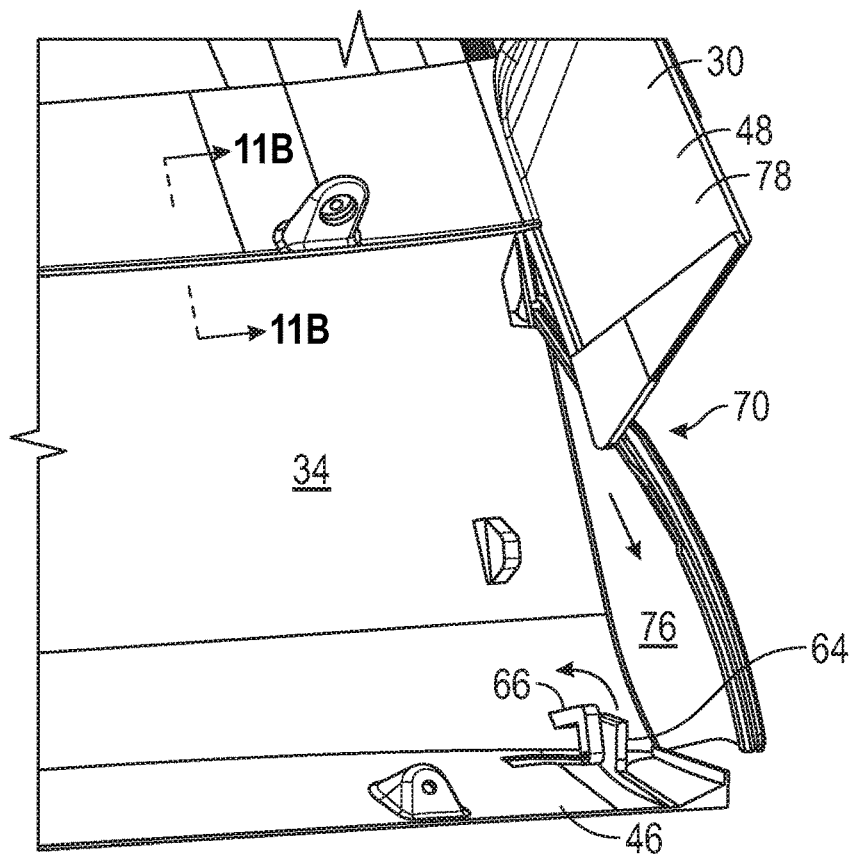
FIG. 11a is a perspective side view of an upper back shell panel, a lower back skirt panel, and a lower back close-out panel in a 30° reclined seat position in accordance with an exemplary embodiment.
Figure 11B:
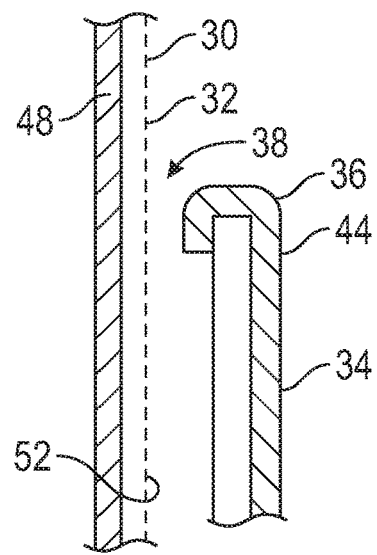
Figure 12:
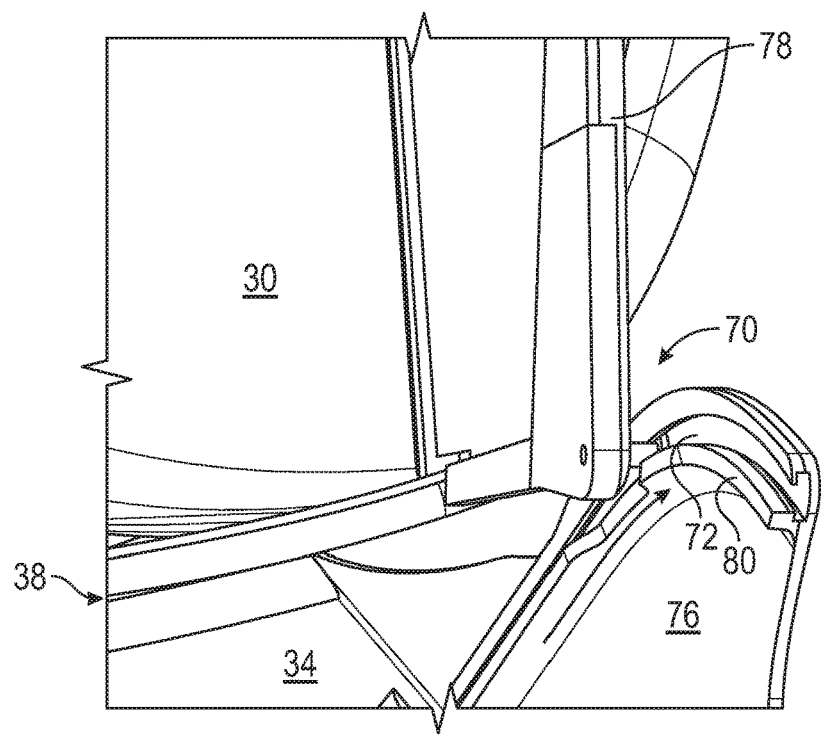
FIG. 12 is a perspective side view of an upper back shell panel and a lower back skirt panel in a 60° reclined seat position in accordance with an exemplary embodiment.
Figure 13:
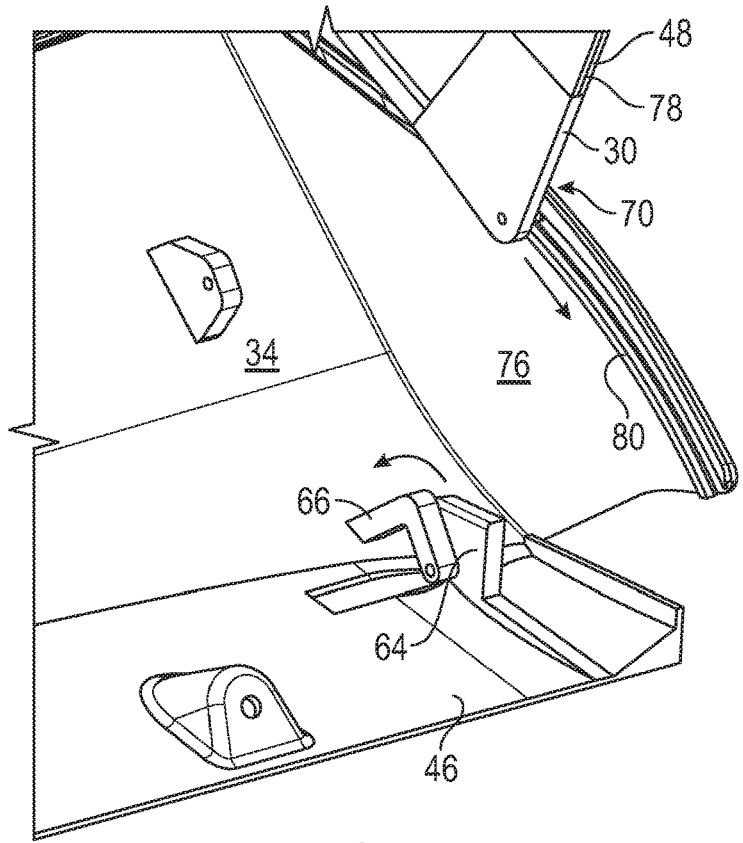
FIG. 13 is a perspective side view of an upper back shell panel, a lower back skirt panel, and a lower back close-out panel in a 60° reclined seat position in accordance with an exemplary embodiment.

The cam element 74 extends generally outward from the outboard extension portion 78 of the upper back shell panel 30 (e.g., from a rearward lower section of the outboard extension portion 78) and may be configured as a positive feature, e.g., guide pin such as a shoulder bolt, bearing, or the like, that slidingly engages the track 72 to allow the positive feature to be advanced along the track 72. As illustrated in FIG. 6, the upper back shell panel 30 may include a plate 90 with the cam element 74 extending outward from the plate 90. The plate 90 as shown is disposed in a pocket 92 formed in the relatively rigid panel 48 and may be fixed, bonded (e.g., epoxy or polyurethane adhesive or the like), or otherwise fastened or attached to the surrounding pocket wall of the relatively rigid panel 48. In one embodiment, the cam element 74 is a shoulder bolt and the plate 90 is a metal plate, e.g., aluminum plate or the like, and the shoulder bolt is attached to (screwed or otherwise threadingly engaged with) and extends substantially perpendicular from the plate 90 with the head of the shoulder bolt arranged in the track 72.

In an exemplary embodiment, the track 72 has an inner cross-sectional profile that corresponds to and is slightly larger than the outer cross-sectional profile of the portion of the cam element 74 that is disposed in the track 72 so that the cam element 74 can slide in the track 72 without binding or otherwise being obstructed. Further, in an exemplary embodiment, by mounting the cam element 74 in the metal plate 90 that is attached to the substantially rigid panel 48 of the upper back shell panel 30, it has been found that the cam element 74 can be stably positioned and remains substantially "true" in the track 72 while being advanced through the track 72 to minimize or prevent any binding.

In an exemplary embodiment and with reference to FIGS. 4-16, the lower back skirt panel 34 including the track 72 (e.g., integrally formed, or as a mounted machined bracket) and the upper back shell panel 30 including the cam element 74 are cooperatively configured to allow the cam element 74 to be advanced along the track 72 to allow controlled relative movement between the lower back skirt panel 34 and the upper back shell panel 30 such that at least the portion of the gap 38 between the upper edge portion 36 of the lower back skirt panel 34 and the outer surface 32 of the upper back shell panel 30 is maintained during movement between the substantially upright seat position and the substantially reclined seat position. As illustrated in FIGS. 2b, 11b, 12, and 16, in an exemplary embodiment, the gap 38 remains substantially the same or increases when the seat assembly 10 is moved from the substantially upright seat position to the substantially reclined seat position. It has been found that by maintaining at least a portion of the gap during relative movement between the lower back skirt panel 34 and the upper back shell panel 30, the panels 30 and 34 may be moved without scuffing, scratching, marring, or otherwise damaging the relatively soft covering materials 44 and 52 (e.g., by keeping the lower back skirt panel 34 off of the upper back shell panel 30) on the panels 30 and 34 to help maintain and aesthetically desirable condition of the seat assembly 10 when viewed from the backside.

Referring to FIGS. 5, 8, 11a, 13, and 15, as discussed above, the lower back close-out panel 46 includes attachment features 64 are pivotably coupled with attachment features 66 of the lower back skirt panel 34 via a corresponding pin(s) 65. As illustrated, when the seat assembly 10 is moved between the substantially upright seat position and the substantially reclined seat position, the lower back skirt panel 34 can rotate about the pin(s) 65 relative to the close-out panel 46 to help control relative movement between the lower back skirt panel 34 and the upper back shell panel 30 to maintain the at least the portion of the gap 38 between the upper edge portion 36 of the lower back skirt panel 34 and the outer surface 32 of the upper back shell panel 30.

Referring to FIGS. 5-7, 10, 12, and 16, as discussed above, one or more biasing elements 68 (e.g., spring or the like) may be used to attach the lower back skirt panel 34 and the seat frame 18. The biasing element 68 may be positioned proximate to the track-cam arrangement 70, for example, a first biasing element 68 positioned proximate to a first track-cam arrangement 70 on the left-hand side of the seat assembly 10 and a second biasing element 68 positioned proximate to a second track-cam arrangement 70 on the right-hand side of the seat assembly 10. In an exemplary embodiment, it has been found that the biasing element 68 helps urge the lower back skirt panel 34 towards the seat frame 18 to help keep cam element 74 against the lower rearward sidewall 80 of the track 72 when the cam element 74 is advanced along the track 72 without binding or otherwise being obstructed particularly near the end portion of the track 72 when the seat assembly 10 approaches the substantially reclined seat position.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A seat assembly comprising:
a seat frame for supporting the seat assembly and comprising a seat structure portion and a backrest structure portion pivotally coupled to the seat structure portion for movement between a substantially upright seat position and a substantially reclined seat position;
an upper back shell panel coupled to the seat frame and having an outer surface on a side opposite the seat frame; and
a lower back skirt panel having an upper edge portion and disposed adjacent to the upper back shell panel and a gap is present between the lower back skirt panel and the upper back shell panel, wherein the lower back skirt panel and the upper back shell panel are cooperatively configured to allow relative movement between each other during movement of the seat frame between the substantially upright seat position and the substantially reclined seat position while maintaining at least a portion of the gap between the lower back skirt panel and the upper back shell panel, wherein the lower back skirt panel and the upper back shell panel are operatively coupled together with a track-cam arrangement, wherein the lower back skirt panel is pivotably coupled to the seat frame.

2. The seat assembly of claim 1, wherein the lower back skirt panel is operatively coupled to the upper back shell panel to allow relative movement between the lower back skirt panel and the upper back shell panel and to maintain the at least the portion of the gap during movement between the substantially upright seat position and the substantially reclined seat position.

3. The seat assembly of claim 2, wherein the track-cam arrangement comprises a track and a cam element that is configured to be advanced along the track to allow controlled relative movement between the lower back skirt panel and the upper back shell panel so as to facilitate maintaining the at least the portion of the gap during movement between the substantially upright seat position and the substantially reclined seat position.

4. The seat assembly of claim 3, wherein the lower back skirt panel comprises the track, which is integrally formed in the lower back skirt panel or is a separate piece mounted to the lower back skirt panel.

5. The seat assembly of claim 4, wherein the lower back skirt panel has an outboard extension portion that comprises the track, which is integrally formed in the outboard extension portion or is a separate piece mounted to the outboard extension portion.

6. The seat assembly of claim 5, wherein the track is configured to include a groove.

7. The seat assembly of claim 6, wherein the groove is a curved "T-shaped" groove.

8. The seat assembly of claim 3, wherein the upper back shell panel comprises the cam element.

9. The seat assembly of claim 8, wherein the upper back shell panel has an outboard extension portion and the cam element extends generally outward from the outboard extension portion.

10. The seat assembly of claim 9, wherein the cam element is a positive feature.

11. The seat assembly of claim 8, wherein the upper back shell panel includes a plate and the cam element extends generally outward from the plate.

12. The seat assembly of claim 2, further comprising at least one biasing element that attaches the lower back skirt panel to the seat frame.

13. The seat assembly of claim 12, wherein the at least one biasing element is disposed proximate to the track-cam arrangement.

14. The seat assembly of claim 1, wherein the lower back skirt panel comprises a relatively rigid skirt panel having an outer rigid skirt panel surface that is on a side opposite the seat frame and a relatively soft covering material that covers the outer rigid skirt panel surface.

15. The seat assembly of claim 1, further comprising a lower back close-out panel that is coupled to the seat frame and that is disposed adjacent to the lower back skirt panel proximate a side opposite the upper back shell panel.

16. The seat assembly of claim 15, wherein the lower back skirt panel is pivotably coupled to the lower back close-out panel.

17. The seat assembly of claim 16, further comprising an elongated element, and wherein the lower back close-out panel includes a first attachment feature that defines a first hole and the lower back skirt panel includes a second attachment feature that defines a second hole, and wherein the pin is disposed through the first and second holes to allow the lower back skirt panel to pivot relative to the lower back close-out panel.

18. A seat assembly comprising:
a seat frame for supporting the seat assembly and comprising a seat structure portion and a backrest structure portion pivotally coupled to the seat structure portion for movement between a substantially upright seat position and a substantially reclined seat position;
an upper back shell panel coupled to the seat frame and having an outer surface on a side opposite the seat frame; and
a lower back skirt panel having an upper edge portion and disposed adjacent to the upper back shell panel and a gap is present between the lower back skirt panel and the upper back shell panel, wherein the lower back skirt panel and the upper back shell panel are cooperatively configured to allow relative movement between each other during movement of the seat frame between the substantially upright seat position and the substantially reclined seat position while maintaining at least a portion of the gap between the lower back skirt panel and the upper back shell panel, wherein the lower back skirt panel and the upper back shell panel are operatively coupled together with a track-cam arrangement, wherein the track-cam arrangement comprises a track and a cam element that is configured to be advanced along the track to allow controlled relative movement between the lower back skirt panel and the upper back shell panel so as to facilitate maintaining the at least the portion of the gap during movement between the substantially upright seat position and the substantially reclined seat position, wherein the lower back skirt panel has a first outboard extension portion that comprises the track and the upper back shell panel has a second outboard extension portion that comprises a plate and the cam element extends generally outward from the plate into the track, wherein the track is integrally formed in the first outboard extension portion or is a separate piece mounted to the first outboard extension portion, wherein the lower back skirt panel is pivotably coupled to the seat frame.

19. A seat assembly comprising:
a seat frame for supporting the seat assembly and comprising a seat structure portion and a backrest structure portion pivotally coupled to the seat structure portion for movement between a substantially upright seat position and a substantially reclined seat position;

an upper back shell panel coupled to the seat frame and having an outer surface on a side opposite the seat frame; and a lower back skirt panel having an upper edge portion and disposed adjacent to the upper back shell panel and a gap is present between the lower back skirt panel and the upper back shell panel, wherein the lower back skirt panel and the upper back shell panel are cooperatively configured to allow relative movement between each other during movement of the seat frame between the substantially upright seat position and the substantially reclined seat position while maintaining at least a portion of the gap between the lower back skirt panel and the upper back shell panel, wherein the lower back skirt panel and the upper back shell panel are operatively coupled together with a track-cam arrangement, wherein the track-cam arrangement comprises a track and a cam element that is configured to be advanced along the track to allow controlled relative movement between the lower back skirt panel and the upper back shell panel so as to facilitate maintaining the at least the portion of the gap during movement between the substantially upright seat position and the substantially reclined seat position, wherein the lower back skirt panel has a first outboard extension portion that comprises the track and the upper back shell panel has a second outboard extension portion that comprises a plate and the cam element extends generally outward from the plate into the track, wherein the track is integrally formed in the first outboard extension portion or is a separate piece mounted to the first outboard extension portion, wherein the seat assembly further comprises at least one biasing element that attaches the lower back skirt panel to the seat frame, and wherein the at least one biasing element is disposed proximate to the track-cam arrangement.

\* \* \* \* \*